United States Patent
Seguchi et al.

(10) Patent No.: US 8,850,968 B2
(45) Date of Patent: Oct. 7, 2014

(54) STEAM GENERATION UNIT AND STEAM COOKING DEVICE USING SAME

(75) Inventors: Youhei Seguchi, Osaka (JP); Shinya Ueda, Osaka (JP); Takashi Utsumi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 365 days.

(21) Appl. No.: 13/500,649

(22) PCT Filed: Oct. 8, 2010

(86) PCT No.: PCT/JP2010/067761
§ 371 (c)(1),
(2), (4) Date: Apr. 6, 2012

(87) PCT Pub. No.: WO2011/043468
PCT Pub. Date: Apr. 14, 2011

(65) Prior Publication Data
US 2012/0199015 A1    Aug. 9, 2012

(30) Foreign Application Priority Data
Oct. 8, 2009   (JP) .................................. 2009-234247

(51) Int. Cl.
| A23L 1/00 | (2006.01) |
| A47J 27/04 | (2006.01) |
| F24C 15/34 | (2006.01) |
| F24C 15/32 | (2006.01) |
| A21B 3/04 | (2006.01) |
| F22B 1/28 | (2006.01) |

(52) U.S. Cl.
CPC ............... *F24C 15/327* (2013.01); *A47J 27/04* (2013.01); *A21B 3/04* (2013.01); *F22B 1/284* (2013.01)
USPC ............... 99/476; 99/474; 219/401; 126/348; 126/369; 126/20

(58) Field of Classification Search
CPC ............ A47J 27/04; A47J 27/16; A21B 3/04; F24C 15/327
USPC .................... 99/474, 475, 476; 219/400, 401; 126/348, 369, 20
See application file for complete search history.

(56) References Cited

U.S. PATENT DOCUMENTS

| 4,173,215 A | * | 11/1979 | Bureau et al. ................. 126/369 |
| 5,170,697 A | * | 12/1992 | Kuboyama ...................... 99/470 |
| 5,515,773 A | * | 5/1996 | Bullard ............................ 99/330 |

(Continued)

FOREIGN PATENT DOCUMENTS

| JP | 57-128001 U | 8/1982 |
| JP | 2004-248900 A | 9/2004 |
| JP | 2006-58003 A | 3/2006 |
| JP | 2008-164284 A | 7/2008 |

*Primary Examiner* — Reginald L Alexander
(74) *Attorney, Agent, or Firm* — Birch, Stewart, Kolasch & Birch, LLP

(57) ABSTRACT

A steam generation device is placed at a lower portion of a side wall of a heating chamber. A steam jet-out part is placed upper than the steam generation device of the side wall of the heating chamber with a distance from the steam generation device. Thus, even if bumping has occurred within a water storage part of the steam generation device, causing boiling water to rush out from a steam supply port into a steam supply pipe, the boiling water is prevented from intruding into a steam jet-out part.

10 Claims, 4 Drawing Sheets

(56) References Cited

U.S. PATENT DOCUMENTS

| | | | |
|---|---|---|---|
| 6,342,262 B1 * | 1/2002 | Wuest | 426/510 |
| 8,704,138 B2 * | 4/2014 | Sells et al. | 219/401 |
| 2007/0006864 A1 | 1/2007 | Kobayashi | |
| 2008/0271612 A1 | 11/2008 | Saksena | |

* cited by examiner

STEAM GENERATION UNIT AND STEAM COOKING DEVICE USING SAME

TECHNICAL FIELD

The present invention relates to a steam generation unit, and a steam cooking device using the same, for supplying steam to a steam-supplied room.

BACKGROUND ART

A conventional cooking device for performing heat cooking with steam generated by a steam generation device is disclosed in JP 2008-164284 A (Patent Literature 1). This cooking device includes a magnetron and a heater as heating means so as to enable to fulfill microwave oven cooking and oven cooking. Further, a steam generation container is placed in a side portion of a heating chamber.

The steam generation container is composed of a container body formed of a recess portion having an opening and a container cover for closing the opening of the container body. The container cover is screwed to the container body, by which a steam generation chamber is defined. A U-shaped steam heater is cast inside the container body. Also a water supply port is provided in the container body. On the other hand, three cylindrical-shaped steam blowoff holes are formed in an upper portion of the container cover.

In an inner surface of the container body, a plurality of radiating fins are formed, including two radiating fins projecting downward from upside of the container body, three radiating fins positioned in lower portions of the individual steam blowoff holes and projecting horizontally, and four radiating fins positioned downward of the radiating fins located in the lower portions of the steam blowoff holes and projecting horizontally.

With this constitution, as a small quantity of water is supplied by a pump to the steam generation container that has been increased to a temperature of around 120° C., the water drops into the steam generation chamber, being instantly vaporized. This steam passes through the plurality of radiating fins, going up and reaching the steam blowoff holes and being released into the heating chamber. In this case, since the radiating fins have also increased to around 120° C. together with the steam generation container, steam brought into contact with the radiating fins is reheated.

Also, a container-cover-side edge of each radiating fin formed inside the steam generation chamber is in contact with the inner surface of the container cover. Therefore, the inside of the steam generation chamber is made labyrinthine by the plural radiating fins extending in plural directions in various configurations. As a result of this, even if water that has flowed into the steam generation chamber is boiled so as to rush up on an inner wall of the steam generation chamber, the boiling water is blocked by the labyrinthine radiating fins from reaching the steam blowoff holes. Furthermore, since the boiling water is heated and vaporized by contact with the radiating fins, the boiling water is prevented from jetting out from the steam blowoff holes.

However, the conventional cooking device disclosed in Patent Literature 1 has the following problems.

That is, the container body and the container cover are formed of metal die casting such as aluminum die casting, and a U-shaped steam heater is cast inside the container body. Still, in the inner surface of the container body, a plurality of radiating fins projecting downward from upper portion and a plurality of radiating fins projecting horizontally from side portion are formed. Forming the container body having such a complex configuration by metal die casting with casting of the U-shaped steam heater is quite difficult because of complexity of the metal mold, leading to cost increases, problematically.

Further, the steam generation container is so structured that the container cover is screwed to the container body having the complex configuration as described above. Therefore, scale is highly likely to accumulate in the steam generation container, and yet accumulated scale is quite hard to remove, problematically.

Moreover, the radiating fins are formed in the container body having the steam heater cast therein. Therefore, the radiating fins have increased in temperature together with the steam generation container to around 120° C., so that generated saturated steam is reheated due to contact with the radiating fins, resulting in superheated steam. Thus, in the case of steamed cooking for puddings, chawan-mushi (custard-like egg and vegetable dishes steamed in a cup), or the like, heating with superheated steam of over 100° C. causes the dishes to be dried, resulting in a poor finished state, problematically.

CITATION LIST

Patent Literature

Patent Literature 1: JP 2008-164284 A

SUMMARY OF INVENTION

Technical Problem

Accordingly, an object of the present invention is to provide a steam generation unit, as well as a steam cooking device using the same, in which its structure is simple, less scale deposition is involved, and in which boiling water never intrudes into a steam-supplied space even upon occurrence of a bumping.

Solution to Problem

In order to solve the problem, a steam generation unit according to the present invention comprises:

a steam generation device for generating steam;

a steam-supplied chamber to which steam generated by the steam generation device is supplied;

a steam supply path for supplying steam generated by the steam generation device to the steam-supplied chamber; and a boiling-water intrusion preventing device which is provided on the steam supply path and which, upon occurrence of bumping in the steam generation device, prevents boiling water from intruding into the steam-supplied chamber.

With this constitution, since the boiling-water intrusion preventing device is provided on the steam supply path for supplying steam generated by the steam generation device to the steam-supplied chamber, boiling water, upon occurrence of bumping in the steam generation device, can be prevented from intruding into the steam-supplied chamber. Therefore, occurrence of temperature specks in the steam-supplied chamber due to intrusion of the boiling water into the steam-supplied chamber can be prevented.

In this case, with the boiling-water intrusion preventing device provided on the steam supply path, the steam generation device can be formed into a simple structure including no protrusions or the like inside. Thus, a simple metal mold will do for cases in which the steam generation device is formed by metal die casting, so that leading to cost increases can be prevented. Further, since the steam generation device is in a simple structure, scale is less likely to accumulate inside, and moreover even accumulated scale is quite easy to remove.

Moreover, the boiling-water intrusion preventing device is never reheated by the water-heating heater of the steam generation device, so that saturated steam generated by the steam generation device can be prevented from being reheated and formed into superheated steam by the heated boiling-water intrusion preventing device or the like. Therefore, in the case of steamed cooking using eggs such as puddings or chawanmushi, there occurs no heating with superheated steam of over 100° C., so that drying and worsened finish of the food can be prevented.

In an embodiment,
the steam supply path includes:
a steam jet-out part which is placed on a side wall of the steam-supplied chamber and which, upon supply of steam generated by the steam generation device, jets out the supplied steam into the steam-supplied chamber; and
a steam supply passage which connects the steam generation device and the steam jet-out part to each other and which supplies steam generated by the steam generation device to the steam jet-out part, wherein
the steam generation device is positioned lower than the steam jet-out part, and the steam supply passage is provided so as to extend upward from the steam generation device side toward the steam jet-out part side, whereby the steam jet-out part and the steam supply passage constitute the boiling-water intrusion preventing device.

According to this embodiment, the steam generation device is positioned lower than the steam jet-out part, and the steam supply passage is provided so as to extend upward. Therefore, even if bumping has occurred in the steam generation device so that boiling water rushes out into the steam supply path, the boiling water can be prevented from intruding into the steam jet-out part. As a consequence, occurrence of temperature specks in the steam-supplied chamber due to rushing of the boiling water into the steam-supplied chamber can be prevented.

Further, even if the boiling water has intruded into the steam jet-out part, the boiling water is separated from steam in the steam jet-out part, and returned via the steam supply passage into the steam generation device.

An embodiment comprise
a liquid return passage for connecting the steam generation device and the steam jet-out part to each other and for returning liquid in the steam jet-out part to the steam generation device.

According to this embodiment, a liquid return passage for returning liquid in the steam jet-out part to the steam generation device is included. Therefore, upon occurrence of bumping in the steam generation device, boiling water that has intruded into the steam jet-out part is allowed to pass through the liquid return passage and return into the steam generation device. As a consequence, boiling water running toward the steam generation device within the liquid return passage can be prevented from being interrupted by saturated steam rushing up toward the steam jet-out part within the steam supply passage, so that the boiling water can be returned to the steam generation device promptly and securely.

An embodiment comprises
a one-way valve device which is interveniently provided on the liquid return passage and which permits a flow of liquid from the steam jet-out part side to the steam generation device side and prohibits a flow of liquid from the steam generation device to the steam jet-out part side.

According to this embodiment, a one-way valve device is interveniently provided on the liquid return passage. Therefore, boiling water or condensed water running from the steam jet-out part toward the steam generation device is allowed to promptly pass through within the liquid return passage. Moreover, boiling water that has intruded from the steam generation device can be blocked by the one-way valve device so as to be prevented from intruding into the steam jet-out part.

In an embodiment,
the steam generation device is positioned lower than the steam-supplied chamber, and the steam supply path is provided so as to extend upward from the steam generation device side toward the steam-supplied chamber side, whereby the steam supply path itself constitutes the boiling-water intrusion preventing device.

According to this embodiment, the steam generation device is positioned lower than the steam-supplied chamber, and the steam supply path is provided so as to extend upward. Therefore, even if bumping has occurred in the steam generation device so that boiling water rushes out into the steam supply path, the boiling water can be prevented from intruding into the steam-supplied chamber. As a consequence, occurrence of temperature specks in the steam-supplied chamber can be prevented.

In an embodiment,
the steam generation device is positioned upper than or generally equal in height to the steam-supplied chamber, and the steam supply path is upwardly bent so as to extend through a position higher than the steam generation device, whereby the steam supply path itself constitutes the boiling-water intrusion preventing device.

According to this embodiment, the steam generation device is positioned upper than or generally equal in height to the steam-supplied chamber, and the steam supply path is upwardly bent. Therefore, even if bumping has occurred in the steam generation device so that boiling water rushes out into the steam supply path, the boiling water cannot go beyond the once-going-up place of the steam supply path and thus prevented from intruding into the steam-supplied chamber.

In an embodiment,
the steam supply path includes no downwardly-bent portion.

According to this embodiment, the boiling water that has not gone beyond the going-up place of the steam supply path can be prevented from accumulating at the downwardly bent recessed portion of the steam supply path. Therefore, it can be prevented that boiling water that has accumulated at the recessed portion of the steam supply path is jetted up by steam pressure of the saturated steam derived from the steam generation device so as to go beyond the going-up place of the steam supply path.

In an embodiment,
the steam supply path includes:
a steam jet-out part which is placed on a side wall of the steam-supplied chamber and which, upon supply of steam generated by the steam generation device, jets out the supplied steam into the steam-supplied chamber; and
a steam supply passage which connects the steam generation device and the steam jet-out part to each other and which supplies steam generated by the steam generation device to the steam jet-out part, wherein
a steam jet-out nozzle for jetting out steam into the steam-supplied chamber is provided on a side face of the steam jet-out part, and wherein
a separation plate is placed near the steam jet-out nozzle within the steam jet-out part and has a first surface vertically extending and facing the steam jet-out nozzle and a second surface adjoining to the first surface, where an upper end of the first surface is separate from a top face of the steam jet-out part and forms a top opening so as to allow steam introduced from a steam inlet port to pass therethrough while a fore end of the second surface is fitted in close contact to the side face of the steam jet-out part, thus the separation plate serving for separating steam and boiling water from each other, whereby the separation plate constitutes the boiling-water intrusion preventing device.

According to this embodiment, saturated steam introduced into the steam jet-out part goes beyond the first surface of the separation plate so as to be supplied from the top opening into the steam-supplied chamber. Also, even if bumping has occurred in the steam generation device so that boiling water rushes out into the steam jet-out part, the boiling water cannot go beyond the first surface and thus is blocked by the separation plate from intruding into the steam-supplied chamber. As a consequence, occurrence of temperature specks in the steam-supplied chamber due to rushing of the boiling water into the steam-supplied chamber can be prevented.

In an embodiment, the steam-supplied chamber is heating chamber for performing heat cooking of a heating object, which is to be heated, with steam supplied from the steam supply path, or a steam heating device for heating steam, which has been supplied from the steam supply path, to generate superheated steam and then jetting out the superheated steam into the heating chamber.

With this constitution, the steam cooking device includes the steam generation unit capable of, upon occurrence of bumping in the steam generation device, preventing boiling water from intruding into the steam-supplied chamber. Therefore, upon occurrence of bumping in the steam generation device, boiling water can be prevented from intruding into the heating chamber as the steam-supplied chamber or the steam heating device. Thus, it can be prevented that the boiling water intrudes into the heating chamber and splashes onto the heating object to cause heating specks on the heating object. Otherwise, it can be prevented that the boiling water intrudes into the steam heating device and drops onto the bottom face of the steam heating device to cause temperature specks and, as a result, cause heating specks on the heating object in the heating chamber.

Further, the boiling water or water that has overflowed from the steam generation device can be prevented from splashing onto the on-state steam heating device and causing vapor explosions or the like.

Advantageous Effects Of Invention

As apparent from the above description, the steam generation unit according to the invention includes the boiling-water intrusion preventing device provided on the steam supply path for supplying steam generated by the steam generation device to the steam-supplied chamber, so that upon occurrence of bumping in the steam generation device, boiling water can be prevented from intruding into the steam-supplied chamber. Therefore, occurrence of temperature specks in the steam-supplied chamber due to intrusion of the boiling water into the steam-supplied chamber can be prevented.

Further, since the boiling-water intrusion preventing device is provided on the steam supply path, the steam generation device can be provided in a simple structure including no protrusions or the like inside. Thus, a simple metal mold will do for cases in which the steam generation device is formed by metal die casting, so that leading to cost increases can be prevented. Further, since the steam generation device is in a simple structure, scale is less likely to accumulate inside, and moreover even accumulated scale is quite easy to remove.

Moreover, the steam cooking device according to the invention includes the steam generation unit capable of, upon occurrence of bumping in the steam generation device, preventing boiling water from intruding into the steam-supplied chamber. Therefore, upon occurrence of bumping in the steam generation device, boiling water can be prevented from intruding into the heating chamber as the steam-supplied chamber or the steam heating device. Thus, it can be prevented that the boiling water intrudes into the heating chamber and splashes onto the heating object to cause heating specks on the heating object. Otherwise, it can be prevented that the boiling water intrudes into the steam heating device and drops onto the bottom face of the steam heating device to cause temperature specks and, as a result, cause heating specks on the heating object in the heating chamber.

Further, the boiling water or water that has overflowed from the steam generation device can be prevented from splashing onto the steam heating heater of the on-state steam heating device and causing vapor explosions or the like.

DESCRIPTION OF EMBODIMENTS

Hereinbelow, the present invention will be described in detail by way of embodiments thereof illustrated in the accompanying drawings.

First Embodiment

Figure 1:
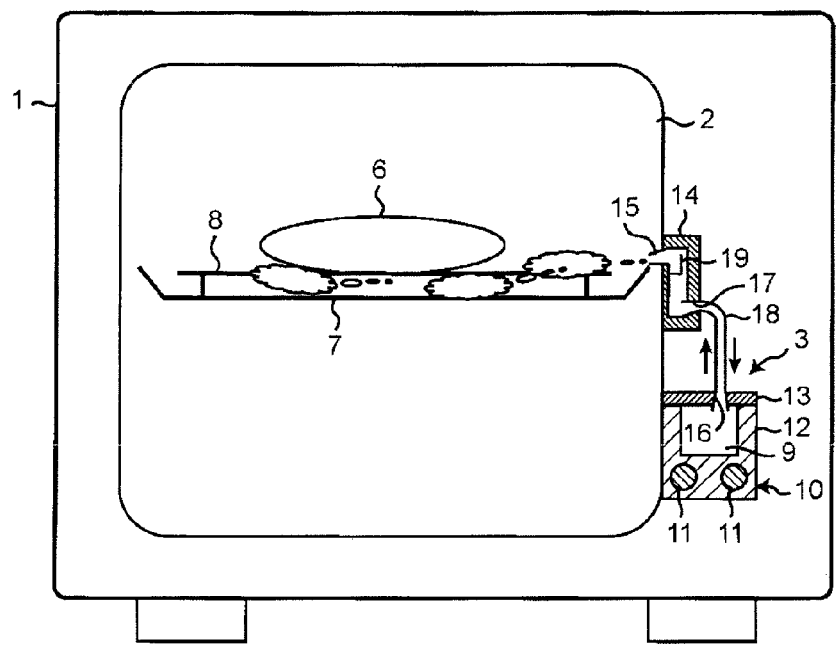
FIG. 1 is a longitudinal sectional view of a cooking device using a steam generation unit according to the present invention, as viewed from its front side.
Figure 2:
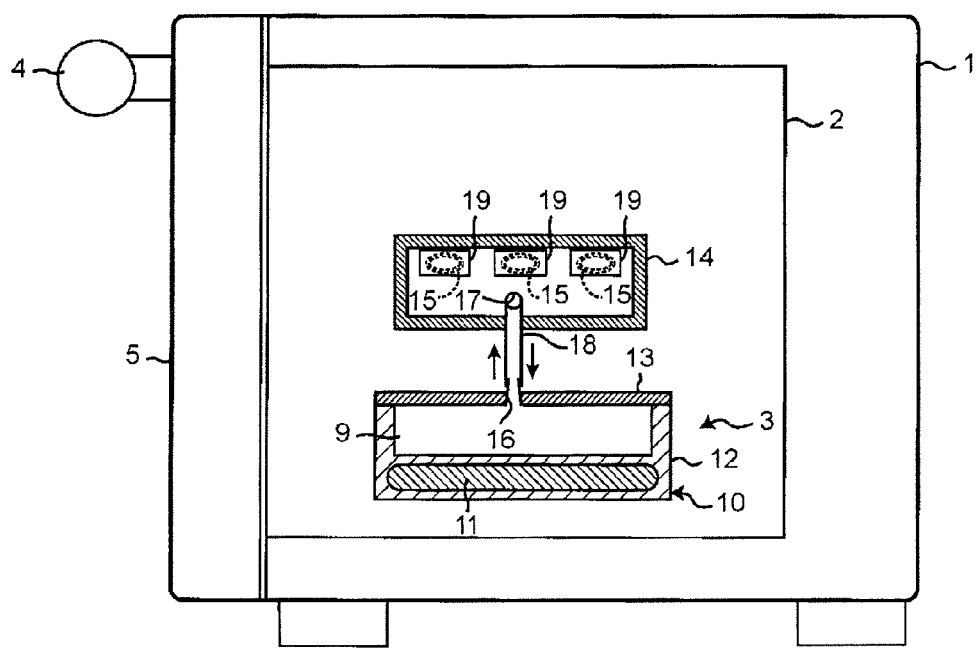
FIG. 2 is a longitudinal sectional view of the cooking device shown in FIG. 1, as viewed from a side-face side.

FIGS. 1 and 2 are schematic views showing a basic construction of a cooking device using a steam generation unit according to this embodiment. FIG. 1 is a longitudinal sectional view as viewed from its front side, and FIG. 2 is a longitudinal sectional view as viewed from a side-face side.

As shown in FIGS. 1 and 2, the cooking device includes a main casing 1, a heating chamber 2 for forming a steam-supplied space provided in the main casing 1, and a steam generation device 3 for generating steam.

The heating chamber 2 has an opening on its front side, and its side plates, bottom plate and top plate are formed of stainless steel plates. By opening and closing the opening with a door 5 equipped with a handle 4, a user is allowed to put a heating object (food) 6 into and out of the heating chamber 2 through the opening. Around the heating chamber 2, a heat insulating material (not shown) is placed to thermally insulate inside of the heating chamber 2 from its outside.

Within the heating chamber 2, a stainless tray 7 is also placed with a specified gap from the bottom plate of the heating chamber 2. The tray 7 is supported by holding racks (not shown) provided in plural stages on the right-and-left side plates in the heating chamber 2. Then, on the tray 7, a grid-like cooking net 8 formed of stainless steel wire is placed, and a heating object 6 is placed generally at a center of the cooking net 8. Thus, the heating object 6 is housed in the heating chamber 2 with a gap from the bottom plate of the heating chamber 2.

The steam generation device 3 includes a steam generation section 10 having a water storage part 9, and water-heating heaters 11 placed at lower portions of the water storage part 9 and serving for heating and vaporizing water in the water storage part 9. Each water-heating heater 11 is formed by bending a sheath heater into a U-like shape. The steam generation section 10 is composed of a main part 12 with the water storage part 9 provided therein, and a cover part 13 for covering the water storage part 9 of the main part 12. The main part 12 is formed of metal die casting such as aluminum die casting, and the water-heating heaters 11 are cast at lower portions of the water storage part 9. The water storage part 9 is supplied with water in a supply water tank (not shown) by a pump (not shown).

The steam generation device 3 is set up at a lower portion of an outer surface of a side wall of the heating chamber 2. Then, in a portion of the side-wall outer surface of the heating chamber 2 upper than the steam generation device 3, a steam jet-out part 14 which serves as a gas-liquid separation part and which jets out saturated steam generated by the steam generation device 3 into the heating chamber 2. The steam jet-out part 14 is formed of metal die casting such as aluminum die casting and shaped into a flat rectangular parallelepiped form, and three steam jet-out nozzles 15 having their fore ends projected into the heating chamber 2 are fitted in upper portion of a heating chamber 2-side side wall of the steam jet-out part 14.

In the cover part 13 of the steam generation device 3, a steam supply port 16 for supplying saturated steam generated in the water storage part 9 to the steam jet-out part 14 is provided. A steam inlet port 17 for introducing steam derived from the steam generation device 3 is provided at a bottom portion of a side wall of the steam jet-out part 14 on the side counter to the heating chamber 2 side. Then, the steam supply port 16 of the steam generation device 3 and the steam inlet port 17 of the steam jet-out part 14 are connected to each other by a steam supply pipe 18 bent from outer to inner side. Also, three separation plates 19 each bent into an L shape and having a rectangular surface facing the opening of the steam jet-out nozzle 15 to separate steam and boiling water from each other are fitted in an inner surface of the heating chamber 2-side side wall in the steam jet-out part 14.

That is, in this embodiment, the steam generation device 3, the steam jet-out part 14 and the steam supply pipe 18 constitute the steam generation unit.

With this constitution, water supplied from the supply water tank to the water storage part 9 of the steam generation section 10 is heated by the water-heating heaters 11, and generated saturated steam is supplied via the steam supply pipe 18 into the steam jet-out part 14 by steam pressure. Then, the saturated steam is jetted out from the three steam jet-out nozzles 15 of the steam jet-out part 14 toward the heating object 6 in the heating chamber 2.

In this case, the steam generation device 3 is placed at a lower portion of the side-wall outer surface of the heating chamber 2. On the other hand, the steam jet-out part 14 is placed upper than the steam generation device 3 in the side-wall outer surface of the heating chamber 2 with a distance to the steam generation device 3. Therefore, even if bumping has occurred in the water storage part 9 of the steam generation device 3 so that boiling water rushes out from the steam supply port 16 of the cover part 13 into the steam supply pipe 18, the boiling water never intrudes into the steam jet-out part 14 by virtue of a far distance to the steam inlet port 17 of the steam jet-out part 14 and a bending of the steam supply pipe 18. As a consequence, the boiling water is prevented from jetting out into the heating chamber 2 and splashing onto the heating object 6 with heating specks thereon.

Further, even if the boiling water has intruded into the steam jet-out part 14, the separation plates 19 for separating steam and boiling water from each other are fitted so as to face the opening of the steam jet-out nozzle 15. Therefore, the boiling water is separated from steam by the separation plates 19 so as to be returned through the steam inlet port 17 via the steam supply pipe 18 into the water storage part 9.

The main part 12 of the steam generation section 10 has a simple structure including no protrusions or the like in the water storage part 9. The steam jet-out part initially also has a simple structure including no protrusions or the like in its inside because the steam jet-out nozzles 15 and the separation plates 19 are fitted later. Thus, simple metal molds will do for cases in which those members are formed by metal die casting, leading to no cost increases. Further, the steam generation section 10 is provided in such a simple structure as described above. Therefore, scale is less likely to accumulate in the water storage part 9, and moreover even accumulated scale is quite easy to remove.

The steam jet-out part 14 with the separation plates 19 fitted inside is placed with a distance from the steam generation device 3 having the water-heating heaters 11 provided therein. Therefore, the separation plates 19 are never heated by the water-heating heaters 11, so that it can be prevented that steam within the steam jet-out part 14 is heated by the separation plates 19. Thus, saturated steam generated in the water storage part 9 is jetted out into the heating chamber 2 while kept in a saturated-steam state without being subjected to excessive heat exchange with the separation plates 19.

That is, according to the steam generation unit of this embodiment, generated saturated steam is prevented from being reheated by the separation plates 19 or the like into superheated steam. Therefore, in the case of steamed cooking using eggs such as puddings or chawan-mushi, there occurs no heating with superheated steam of over 100° C., so that drying and worsened finish of the food can be prevented.

Now modifications of the above-described steam generation unit will be described below.

Figure 3:
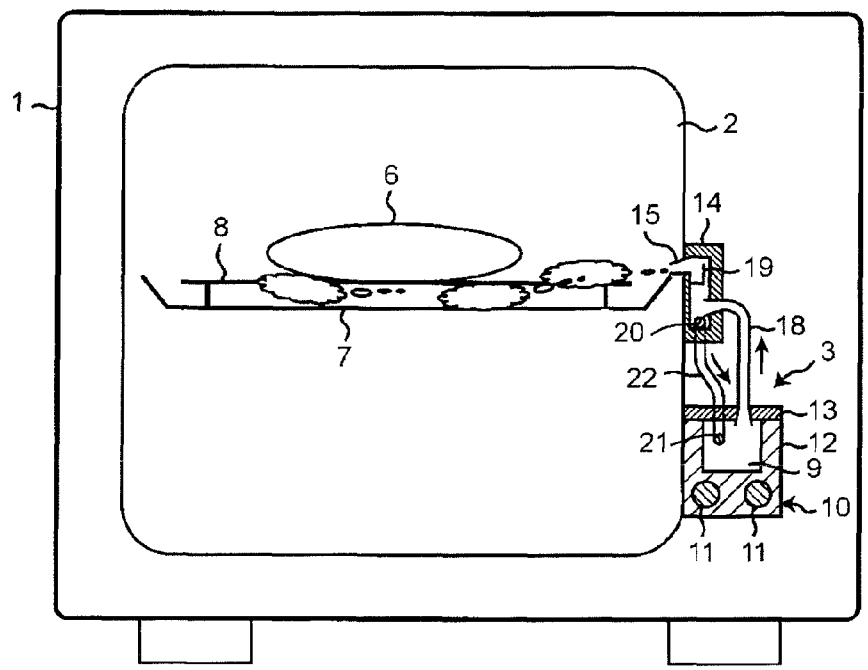
FIG. 3 is a longitudinal sectional view of a cooking device using a steam generation unit different from that of FIG. 1, as viewed from its front side.
Figure 4:
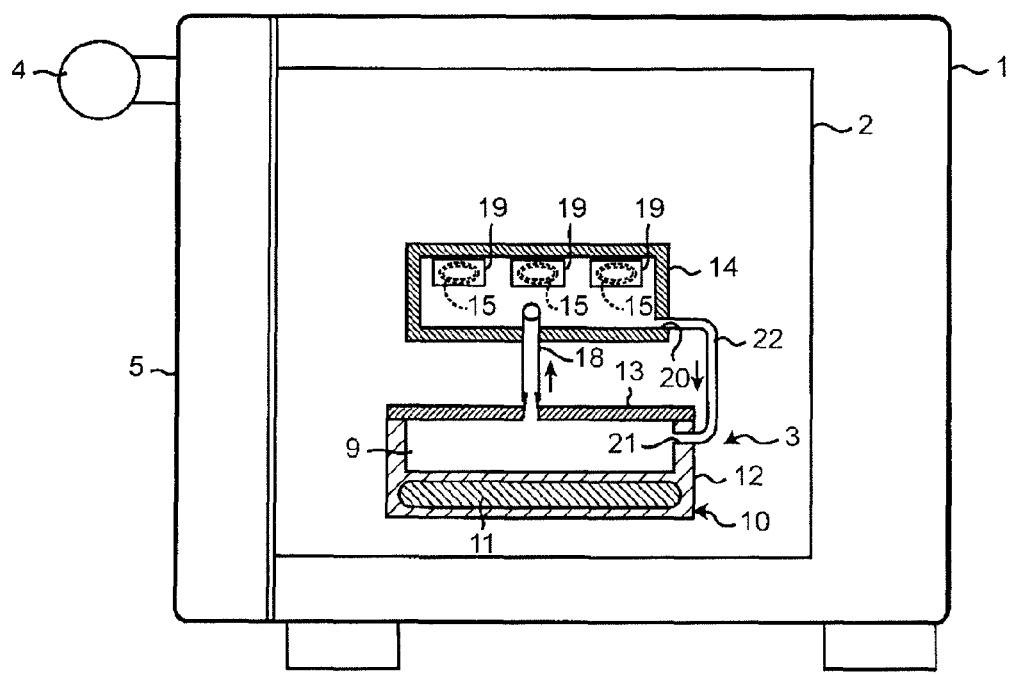
FIG. 4 is a longitudinal sectional view of the cooking device shown in FIG. 3, as viewed from a side-face side.

FIGS. 3 and 4 are schematic views of a cooking device using a steam generation unit according to a first modification. FIG. 3 is a longitudinal sectional view as viewed from the front side, and FIG. 4 is a longitudinal sectional view as viewed from a side-face side.

The steam generation unit of the first modification differs from the steam generation unit shown in FIGS. 1 and 2 in that the steam jet-out part 14 and the steam generation section 10 are connected to each other with a liquid return pipe 22. Hereinbelow, the same component members as in the steam generation unit shown in FIGS. 1 and 2 are designated by the same reference signs and their detailed description is omitted. Then, differences from the steam generation unit shown in FIGS. 1 and 2 will be explained below.

In the steam generation unit of the first modification, a liquid return port 20 for returning liquid such as the boiling water and condensed water to the water storage part 9 of the steam generation section 10 is provided at a lower portion of a side face of the steam jet-out part 14. Also, a liquid inlet port 21 for taking in liquid returned from the steam jet-out part 14 is provided at a upper portion of a side face of the main part 12 of the steam generation section 10. Then, the liquid return port 20 and the liquid inlet port 21 are connected to each other with the liquid return pipe 22.

In the steam generation unit shown in FIGS. 1 and 2, upon occurrence of bumping in the water storage part 9, boiling water that has intruded halfway on the steam supply pipe 18 or boiling water that has passed through the steam supply pipe 18 and intruded into the steam jet-out part 14 returns through the steam supply pipe 18 into the water storage part 9. In this case, saturated steam derived from the steam generation section 10 is rushing up toward the steam jet-out part 14 in the steam supply pipe 18. Thus, there is a possibility that the boiling water running in the steam supply pipe 18 toward the water storage part 9 may be forced back by the saturated steam rushing up toward the steam jet-out part 14 so as to intrude once again into the steam jet-out part 14.

Accordingly, in this first modification, the liquid return pipe 22 for connecting the steam jet-out part 14 and the steam generation section 10 to each other is used as a passage exclusive for returning the boiling water, which has intruded into the steam jet-out part 14, to the water storage part 9. However, the boiling water that has intruded halfway on the steam supply pipe 18 passes through the steam supply pipe 18 to return into the water storage part 9. Thus, the boiling water running in the liquid return pipe 22 toward the water storage part 9 is allowed to return to the water storage part 9 promptly and securely without being interrupted by the saturated steam rushing in the steam supply pipe 18 toward the steam jet-out part 14.

That is, in this first modification, the steam generation device 3, the steam jet-out part 14, the steam supply pipe 18 and the liquid return pipe 22 constitute the steam generation unit.

Figure 5:
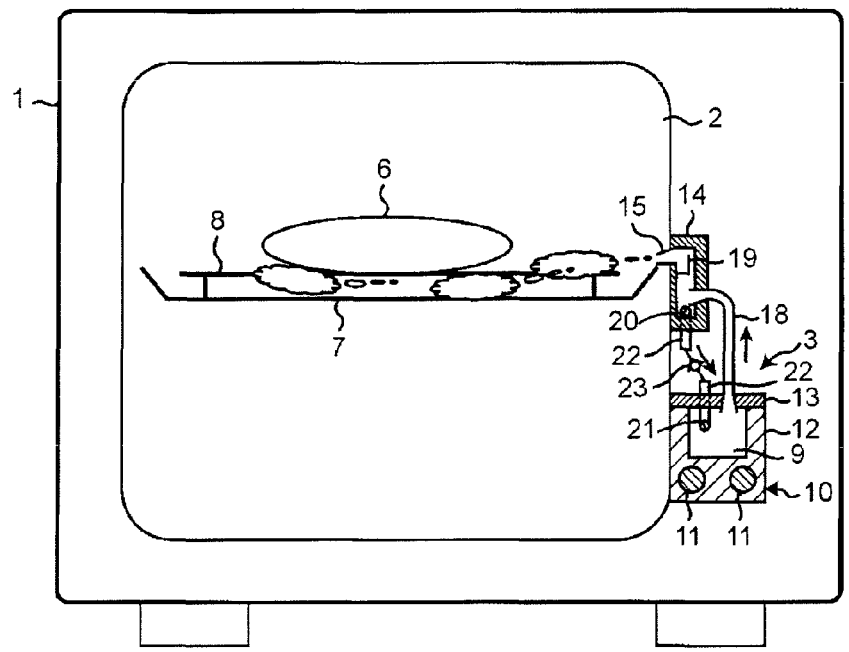
FIG. 5 is a view of a cooking device using a steam generation unit different from those of FIGS. 1 and 3, as viewed from its front side.
Figure 6:
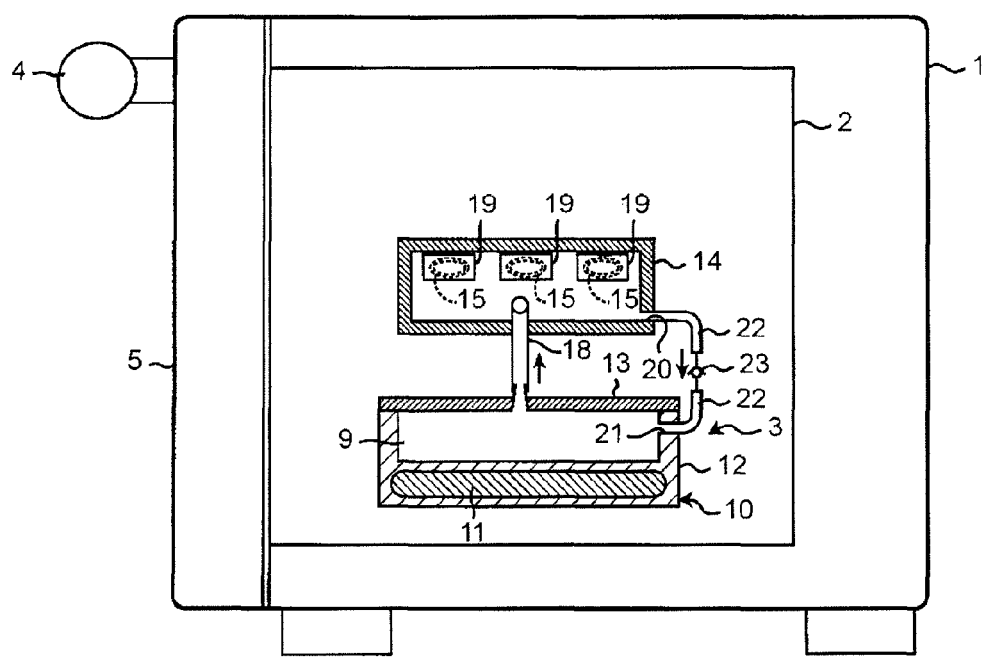
FIG. 6 is a longitudinal sectional view of the cooking device shown in FIG. 5, as viewed from a side-face side.

FIGS. 5 and 6 are schematic views of a cooking device using a steam generation unit according to a second modification. FIG. 5 is a longitudinal sectional view as viewed from the front side, and FIG. 6 is a longitudinal sectional view as viewed from a side-face side.

The steam generation unit of the second modification differs from the steam generation unit of the first modification in that a check valve 23 as a one-way valve device is provided interveniently on the liquid return pipe 22 that connects the steam jet-out part 14 and the steam generation section 10 to each other. Hereinbelow, the same component members as in the steam generation unit of the first modification are designated by the same reference signs as in FIGS. 3 and 4, and their detailed description is omitted. Then, differences from the first modification will be explained below.

In the steam generation unit of the second modification, the liquid return port 20 provided at a side-face lower portion of the steam jet-out part 14 and the liquid inlet port 21 provided at a side-face upper portion of the main part 12 of the steam generation section 10 are connected to each other by the liquid return pipe 22 having the check valve 23 interveniently provided thereon.

In the steam generation unit of the first modification, the liquid return pipe 22 for connecting the steam jet-out part 14 and the steam generation section 10 to each other is provided as a passage exclusive for returning the boiling water, which has intruded into the steam jet-out part 14, to the water storage part 9. In this case, upon occurrence of bumping in the water storage part 9, boiling water intrudes into the liquid inlet port 21 on the steam generation section 10 side and, in some cases, may enter into the steam jet-out part 14 via the liquid return pipe 22.

Accordingly, in this second modification, the check valve 23 is interveniently provided on the liquid return pipe 22 that connects the steam jet-out part 14 and the steam generation section 10 to each other, the check valve 23 working for prohibiting a liquid flow from the steam generation section 10 side to the steam jet-out part 14 side while permitting a liquid flow from the steam jet-out part 14 side to the steam generation section 10 side. Thus, boiling water or condensed water running from the steam jet-out part 14 toward the water storage part 9 is allowed to promptly pass through within the liquid return pipe 22. Meanwhile, boiling water that has intruded from the liquid inlet port 21 of the water storage part 9 to the liquid return pipe 22 is blocked by the check valve 23 so as to be prohibited from entering the steam jet-out part 14.

That is, in this second modification, the steam generation device 3, the steam jet-out part 14, the steam supply pipe 18, the liquid return pipe 22 and the check valve 23 constitute the steam generation unit.

In this embodiment, the separation plates 19 for separating steam and boiling water from each other are fitted on a heating chamber 2-side side wall of the steam jet-out part 14. However, the separation plates 19 are not necessarily needed. In this embodiment, the steam jet-out part 14 is placed upper than the steam generation device 3 with a distance from the steam generation device 3, so that boiling water that has rushed into the steam supply pipe 18 upon occurrence of bumping in the water storage part 9 is prevented from reaching inside of the steam jet-out part 14. Therefore, in the case where the distance between the steam jet-out part 14 and the steam generation device 3 can be set to such a distance that boiling water that has rushed into the steam supply pipe 18 cannot reach inside of the steam jet-out part 14, the separation plates 19 do not necessarily have to be provided.

Also, in the second modification of this embodiment, the check valve 23 is interveniently provided on the liquid return pipe 22. However, in this invention, without being limited to the check valve 23, valves that permit a fluid flow only in one direction may be used, including one-way valve devices usable even for medical use.

Second Embodiment

In the first embodiment described above, the steam generation device 3 is placed on a side wall of the heating chamber 2 so that saturated steam generated by the steam generation device 3 is jetted out into the heating chamber 2. In contrast to this, there has been provided a cooking device in which a steam heating device with a steam-heating heater contained therein is placed on a heating chamber so that saturated steam generated by the steam generation section placed outside the heating chamber is jetted into the heating chamber via the steam heating device. In this case, when the steam-heating heater is turned on, superheated steam heated to an superheated state of 100° C. or higher is jetted into the heating chamber. When the steam-heating heater is turned off, saturated steam is jetted as it is into the heating chamber. This embodiment relates to a cooking device in which saturated steam generated by the steam generation section is jetted into the heating chamber via the steam heating device.

Figure 7:
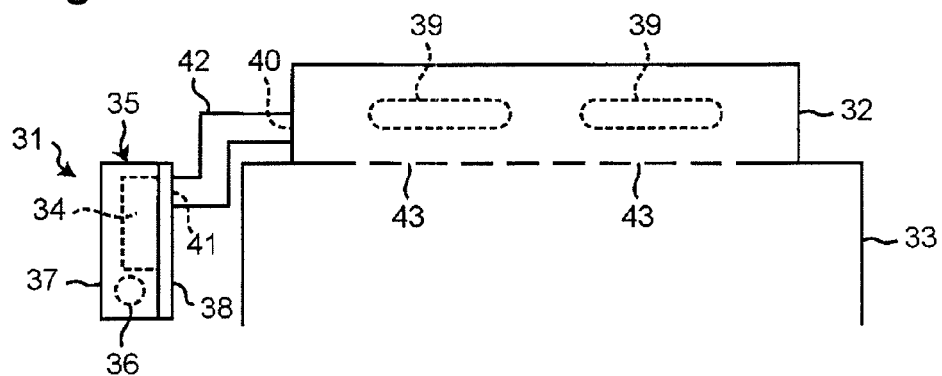
FIG. 7 is a main section of a cooking device using a steam generation unit different from those of FIGS. 1, 3 and 5.

FIG. 7 is a view showing main part of a cooking device using a steam generation unit according to this embodiment. In FIG. 7, the main casing has been removed. Reference numeral 31 denotes a steam generation device, which is placed on one side of a heating chamber 33. Numeral 32 denotes a steam heating device defining the steam-supplied space described before, which is placed on the heating chamber 33. In this embodiment, a vertical position of the steam generation device 31 is lower than that of steam heating device 32.

The steam generation device 31 includes a steam generation section 35 having a water storage part 34, and a water-heating heater 36 placed at a lower portion of the water storage part 34 and serving for heating and vaporizing water in the water storage part 34. The steam generation section 35 is composed of a main part 37 with the water storage part 9 provided therein, and a cover part 38 for covering the water storage part 34 of the main part 37. The main part 37 is formed of metal die casting such as aluminum die casting, and the water-heating heater 36 is cast at a lower portion of the water storage part 34. The water storage part 34 is supplied with water in a supply water tank (not shown) by a pump (not shown).

The steam heating device 32 is formed into a box frame with its bottom portion opened, and has a steam-heating heater 39 contained inside. A steam blow-in port 40 is provided in a steam generation device 31-side side face of the steam heating device 32. Also, a steam supply port 41 is provided in the cover part 38 of the steam generation section 35. Then, the steam supply port 41 of the steam generation section 35 and the steam blow-in port 40 of the steam heating device 32 are connected to each other by a steam supply pipe 42. In this case, as described above, the vertical position of the steam generation device 31 is is lower than that of the steam heating device 32. Therefore, the steam supply pipe 42 extends upward while bending from the steam generation device 31 side toward the steam heating device 32 side.

That is, in this embodiment, the steam generation device 31 and the steam supply pipe 42 constitute the steam generation unit.

With this constitution, water supplied from the supply water tank to the water storage part 34 of the steam generation section 35 is heated by the water-heating heater 36, and generated saturated steam is supplied via the steam supply pipe 42 into the steam heating device 32 by steam pressure. In a region of a top plate of the heating chamber 33 where the steam heating device 32 is placed, a plurality of steam blowoff openings 43 are provided. Therefore, with the steam-heating heater 39 turned on, saturated steam generated by the steam generation section 35 is heated by the steam heating device 32, changed into superheated steam, and jetted out from the steam blowoff openings 43 toward the heating object (not shown) in the heating chamber 33. With the steam-heating heater 39 turned off, on the other hand, saturated steam generated by the steam generation section 35 is not heated by the steam heating device 32, but jetted out, as it is saturated steam, from the steam blowoff openings 43 toward the heating object in the heating chamber 33.

In this case, the steam generation device 31 is positioned lower than the steam heating device 32. Besides, the steam supply pipe 42 for connecting the steam supply port 41 of the steam generation section 35 and the steam blow-in port 40 of the steam heating device 32 to each other extends upward while bending from the steam generation device 31 side toward the steam heating device 32 side. Therefore, in a case where a vertical distance between the steam supply port 41 of the steam generation section 35 and the steam blow-in port 40 of the steam heating device 32 is set to such a distance that boiling water that has rushed into the steam supply pipe 42 cannot reach the steam blow-in port 40, even if bumping has occurred within the water storage part 34 of the steam generation device 31 with the result that boiling water has rushed out from the steam supply port 41 of the cover part 38 into the steam supply pipe 42, the boiling water returns into the water storage part 34 and never intrudes into the steam heating device 32 because the steam supply pipe 42 extends upward without any down from the steam generation device 31 toward the steam heating device 32 side and moreover because the steam supply pipe 42 is bent. Therefore, it can be prevented that the boiling water that has intruded into the steam heating device 32 drops onto the bottom face of the steam heating device 32 (i.e., the top face of the heating chamber 33) so that the top plate of the heating chamber 33 is lowered in temperature to cause heating specks on the heating object in the heating chamber 33. Further, the boiling water or water that has overflowed from the water storage part 34 can be prevented from splashing onto the on-state steam-heating heater 39 and causing vapor explosions or the like.

Also in this embodiment, the main part 37 of the steam generation device 31 has a simple structure including no protrusions or the like in the water storage part 34. Thus, a simple metal mold will do for cases in which the main part 37 is formed by metal die casting, leading to no cost increases. Further, the steam generation section 35 is provided in such a simple structure as described above. Therefore, scale is less likely to accumulate in the water storage part 34, and moreover even accumulated scale is quite easy to remove.

Also, for jet-out of saturated steam into the heating chamber 33 with the steam-heating heater 39 turned off, no article that reheats the saturated steam generated by the steam generation device 31 is provided in the steam generation section 35. Thus, the saturated steam generated by the steam generation device 31 is jetted out into the heating chamber 33 in a near saturated-steam state without being reheated.

Third Embodiment

This embodiment also relates to a cooking device in which saturated steam generated by a steam generation section is jetted into a heating chamber via a steam heating device as in the second embodiment.

Figure 8:
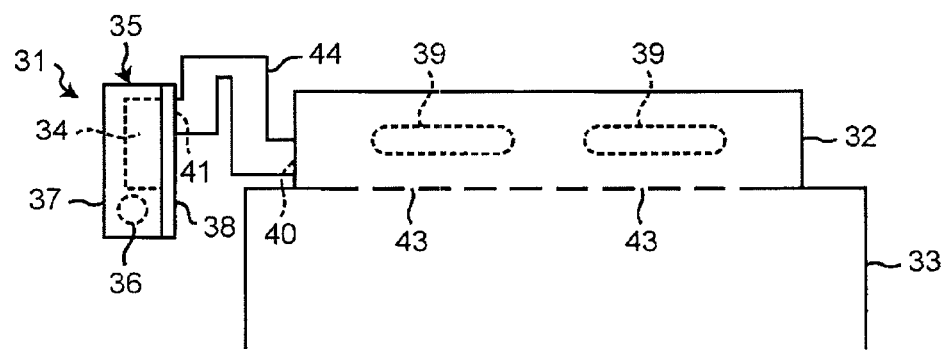
FIG. 8 is a main section of a cooking device using a steam generation unit different from those of FIGS. 1, 3, 5 and 7.

FIG. 8 is a view showing main part of a cooking device using a steam generation unit according to this embodiment. In FIG. 8, the main casing has been removed.

In the steam generation unit of this embodiment, the steam generation device 31 and the steam heating device 32 are positioned generally equal in vertical position to each other. Then, the steam generation unit of this embodiment differs from the steam generation unit of the second embodiment in that the steam generation device 31 and the steam heating device 32 are connected to each other by a steam supply pipe 44 extending so as to go once upward from the steam generation device 31 side toward the steam heating device 32 side and then go downward. Hereinbelow, the same component members as in the steam generation unit of the second embodiment are designated by the same reference signs as in FIG. 7, and their detailed description is omitted. Then, differences from the steam generation unit of the second embodiment will be explained below.

As described above, the steam generation device 31 is positioned generally equal in vertical position to the steam heating device 32 outside the heating chamber 33. Moreover, the steam supply port 41 of the steam generation device 31 and the steam blow-in port 40 of the steam heating device 32 are connected to each other by a steam supply pipe 44 extending so as to go once upward from the steam generation device 31 side toward the steam heating device 32 side and then go downward, i.e., by an upwardly bent steam supply pipe 44. Therefore, in a case where a height of a once-going-up place of the steam supply pipe 44 is set to such a height that boiling water that has rushed into the steam supply pipe 44 cannot go beyond the once-going-up place, even if bumping has occurred within the water storage part 34 of the steam generation device 31 with the result that boiling water has rushed out from the steam supply port 41 of the cover part 38 into the steam supply pipe 44, the boiling water cannot go beyond the once-going-up place of the steam supply pipe 44, thus returning into the water storage part 34. As a result, the boiling water never intrudes into the steam heating device 32.

That is, in this embodiment, the steam generation device 31 and the steam supply pipe 44 constitute the steam generation unit.

In this embodiment, the vertical position of the steam generation device 31 is set generally equal to that of the steam heating device 32. However, the vertical position of the steam generation device 31 may also be set higher than that of the steam heating device 32. Even in this case, on condition that the steam supply pipe 44 is formed so as to go once upward from the steam generation device 31 side toward the steam heating device 32 side and then go downward and that an up-extent of the once-going-up place of the steam supply pipe 44 is set to such an extent that boiling water cannot go beyond, the boiling water cannot go beyond the once-going-up place and thus never intrudes into the steam heating device 32.

Also in this embodiment, the steam supply pipe 44 has an upwardly bent shape. In contrast to this, even in a case where the steam supply pipe has a downwardly bent shape, boiling water cannot go beyond a once-going-up place of the steam supply pipe 44 so that the boiling water never intrudes into the steam heating device 32. In this case, however, the boiling water that has not gone beyond the going-up place of the steam supply pipe accumulates at the downwardly bent place (hereinafter, referred to as recessed portion) of the steam supply pipe. As a result, the boiling water that has accumulated at the recessed portion of the steam supply pipe is jetted up by steam pressure of the saturated steam derived from the steam generation device 31, giving rise to a possibility that the boiling water may go beyond the going-up place of the steam supply pipe, undesirably.

The recessed portion of the steam supply pipe as shown above, even when forming part of the steam supply pipe, is not preferred because the boiling water accumulates therein.

Fourth Embodiment

This embodiment also relates to a cooking device in which saturated steam generated by a steam generation section is jetted into a heating chamber via a steam heating device.

Figure 9:
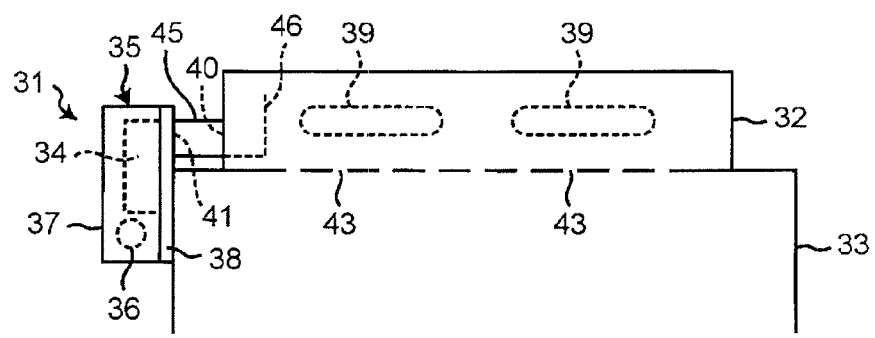
FIG. 9 is a main section of a cooking device using a steam generation unit different from those of FIGS. 1, 3, 5, 7 and 8.

FIG. 9 is a view showing main part of a cooking device using a steam generation unit according to this embodiment. In FIG. 9, the main casing has been removed.

In the steam generation unit of this embodiment, the steam generation device 31 is placed outside a side wall of the heating chamber 33. The steam generation unit of this embodiment differs from the steam generation units of the second and third embodiments in that the vertical position of the steam generation device 31 is set generally equal to that of the steam heating device 32 and that the steam generation device 31 and the steam heating device 32 are connected to each other by a generally horizontal steam supply pipe 45. Hereinbelow, the same component members as in the steam generation units of the second and third embodiments are designated by the same reference signs as in FIGS. 7 and 8, and their detailed description is omitted. Then, differences from the steam generation units of the second and third embodiments will be explained below.

As described above, the steam generation device 31 is placed generally equal in vertical position to the steam heating device 32 outside the heating chamber 33, and the steam supply port 41 of the steam generation device 31 and the steam blow-in port 40 of the steam heating device 32 are connected to each other by the generally horizontal steam supply pipe 45. Also, a top-opened angle 46 having a face opposed to the steam blow-in port 40 and having an opening in its top portion is placed near the steam blow-in port 40 in the steam heating device 32.

For fitting of the top-opened angle 46, one plate is bent into an L-shaped cross section to form two planes. Then, an end portion of one plane is separated off from the top face of the steam heating device 32, while an end portion of the other plane is set in an inner surface of a side wall in which the steam blow-in port 40 of the steam heating device 32 is provided such that the end portion of the other plane is in close contact with the inner surface of the side wall just beneath the steam blow-in port 40. Thus, the one plane of the top-opened angle 46 is opposed to the steam blow-in port 40, and an end portion of the plane is separated off from the top face of the steam heating device 32, forming the top opening through which steam blown in from the steam blow-in port 40 is allowed to pass therethrough. In contrast to this, the end portion of the other plane of the top-opened angle 46 is in close contact with the side face of the steam heating device 32, so that steam or boiling water blown in from the steam blow-in port 40 is inhibited from passing below the top-opened angle 46.

In this way, saturated steam blown in from the steam blow-in port 40 of the steam heating device 32 is allowed to go beyond the one plane of the top-opened angle 46, being supplied into the steam heating device 32 through the top opening. Also, even if bumping has occurred within the water storage part 34 of the steam generation device 31 with the result that boiling water has rushed out from the steam supply port 41 of the cover part 38 into the steam supply pipe 45, the boiling water is blocked by the top-opened angle 46 from intruding into the steam heating device 32. Then, the boiling water that has not intruded into the steam heating device 32 but accumulated on the top-opened angle 46 is returned via the steam supply pipe 45 to the water storage part 34 of the steam generation device 31. Therefore, it can be prevented that the boiling water that has intruded into the steam heating device 32 drops onto the bottom face of the steam heating device 32 (i.e., the top face of the heating chamber 33) so that the top plate of the heating chamber 33 is lowered in temperature to cause heating specks on the heating object. Further, the boiling water or water that has overflowed from the water storage part 34 can be prevented from splashing onto the on-state steam-heating heater 39 and causing vapor explosions or the like.

That is, in this embodiment, the steam generation device 31, the steam supply pipe 45 and the top-opened angle 46 constitute the steam generation unit.

Also in this embodiment, the main part 37 of the steam generation device 31 has a simple structure including no protrusions or the like in the water storage part 34. Thus, a simple metal mold will do for cases in which the main part 37 is formed by metal die casting, leading to no cost increases. Further, the steam generation section 35 is provided in such a simple structure as described above. Therefore, scale is less likely to accumulate in the water storage part 34, and moreover even accumulated scale is quite easy to remove.

Also, for jet-out of saturated steam into the heating chamber 33 with the steam-heating heater 39 turned off, no article that reheats the saturated steam generated by the steam generation device 31 is provided in the steam generation section 35. Thus, the saturated steam generated by the steam generation device 31 is jetted out into the heating chamber 33 in a near saturated-steam state without being reheated.

Also in this embodiment, although the steam generation device 31 is set generally equal in vertical position to the steam heating device 32, yet the steam generation device 31 may well be positioned higher than the steam heating device 32. In such a case also, by the function of the top-opened angle 46, the boiling water that has rushed out into the steam supply pipe 45 can be prevented from intruding into the steam heating device 32.

REFERENCE SIGNS LIST 1 main casing
2, 33 heating chamber
3, 31 steam generation device
9, 34 water storage part
10, 35 steam generation section
11, 36 water-heating heater
14 steam jet-out part
15 steam jet-out nozzle
18, 42, 44, 45 steam supply pipe
19 separation plate
22 liquid return pipe
23 check valve
32 steam heating device
39 steam-heating heater
43 steam blowoff opening
46 top-opened angle

The invention claimed is:

1. A steam generation unit comprising:
a steam generation device for generating steam;
a steam supply path for connecting the steam generation device and a steam-supplied chamber, to which steam generated by the steam generation device is to be supplied, to each other and for supplying steam generated by the steam generation device to the steam-supplied chamber; and
a boiling-water intrusion preventing device which is provided on the steam supply path or in the steam-supplied chamber and which, upon occurrence of bumping in the steam generation device, prevents boiling water from intruding into the steam-supplied chamber, wherein
the steam-supplied chamber includes a heating chamber for heating food,
the steam supply path has a steam supply pipe, and
the boiling-water intrusion preventing device has a box frame,
the box frame having
a steam inlet port to which steam is introduced through the steam supply pipe, and a steam jet-out port from which steam is jetted out into the heating chamber, wherein
the steam inlet port and the steam jet-out port are prevented from facing each other.

2. The steam generation unit as claimed in claim 1, wherein the steam inlet port is provided at a lower portion of the box frame, and the steam generation device is provided lower than the box frame.

3. The steam generation unit as claimed in claim 1, wherein the steam jet-out port is provided in an upper portion of the box frame.

4. The steam generation unit as claimed in claim 1, wherein a heating heater is provided in the box frame.

5. The steam generation unit as claimed in claim 1, wherein a separation plate for separating steam and boiling water from each other is provided in the box frame.

6. A steam cooking device including the steam generation unit as claimed in claim 1.

7. The steam generation unit as claimed in claim 1, wherein the steam jet-out port is provided in an upper portion of the box frame.

8. The steam generation unit as claimed in claim 1, wherein a heating heater is provided in the box frame.

9. The steam generation unit as claimed in claim 1, wherein a separation plate for separating steam and boiling water from each other is provided in the box frame.

10. A steam cooking device including the steam generation unit as claimed in claim 1.

* * * * *